United States Patent [19]

Burgett

[11] Patent Number: 4,974,546
[45] Date of Patent: Dec. 4, 1990

[54] MESS-FREE BIRD FEEDER

[76] Inventor: Barbara Burgett, 897 N. 600 East, Lehi, Utah 84043

[21] Appl. No.: 458,157

[22] Filed: Dec. 27, 1989

[51] Int. Cl.⁵ ............................................. A01K 39/01
[52] U.S. Cl. ...................................... 119/18; 119/57.8
[58] Field of Search .................... 119/18, 52.2, 52.3, 119/57.8, 87.9

[56] References Cited

U.S. PATENT DOCUMENTS

| | | | |
|---|---|---|---|
| 2,031,874 | 2/1936 | Butler et al. | 119/18 |
| 2,309,830 | 2/1943 | Dearle | 119/18 |
| 2,532,726 | 12/1950 | Lajoie et al. | 119/52.2 |
| 2,699,752 | 1/1955 | Reyes | 119/18 |
| 3,415,226 | 12/1968 | Cheung | 119/18 |
| 3,654,904 | 4/1972 | Krueger | 119/18 |
| 3,919,977 | 11/1975 | Clark | 119/18 |
| 4,331,104 | 5/1982 | Clarke | 119/52.3 |

FOREIGN PATENT DOCUMENTS

| | | | |
|---|---|---|---|
| 1197669 | 7/1965 | Fed. Rep. of Germany | 119/52.2 |
| 0298864 | 8/1965 | Netherlands | 119/18 |
| 0613603 | 10/1979 | Switzerland | 119/52.2 |
| 0685482 | 1/1953 | United Kingdom | 119/18 |

Primary Examiner—Robert P. Swiatek
Assistant Examiner—T. Manahan
Attorney, Agent, or Firm—Trask, Britt & Rossa

[57] ABSTRACT

A mess-free bird feeder for a bird cage having enclosing walls and roof, and a generally open bottom. Seeds, seed husks and the like are intercepted and directed downwardly to the droppings tray of the cage, avoiding the scattering of such materials outside of the cage.

9 Claims, 2 Drawing Sheets

MESS-FREE BIRD FEEDER

BACKGROUND OF THE INVENTION

1. Field

This invention relates to a bird feeder. More particularly, it relates to a feeder for avian living quarters such as cages. Live birds are commonly kept in cages in homes, pet shops and veterinary medicine facilities. Such cages typically are elevated from the floor and have a bed which comprises a tray for collecting detritus such as waste feed materials and excrement. Alternatively, the bed may be a screen through which waste materials pass to a droppings tray below. Typically, several layers of newspaper are placed on the tray to keep it relatively clean. Frequent cleaning of the droppings tray by replacing the newspaper, is an unpleasant task, but is necessary to maintain a clean, sanitary and generally oder-free environment for the bird and the bird-keeper.

One well-known problem associated with the keeping of live birds is the scattering of seed, seed husks and other materials outside of the feeding area. Such materials discarded by the bird may be scattered for six feet or more from the cage, and necessitate frequent cleaning of the surrounding floor area. In order to maintain a clean floor area, the bird or birds must be prevented from tossing and scattering feed materials outside of the feeding area.

Birds tend to defecate while feeding, creating an accumulation of droppings immediately below the feeding perch. The proximity of these droppings to the feed tray often results in contamination of the feed.

Another common occurrence is the dropping of bird excrement from above onto the feed tray and perch, contaminating and wetting the feed and feeding area.

2. State of the Art

U.S. Pat. No. 3,654,904 of Krueger proposed a solution the cleaning problem. In that publication, a generally enclosed feeder is disclosed which has a bottom tray for collecting waste materials, and preventing their passage into the droppings tray of the bird cage. The apparatus has a major disadvantage in that its use results in two trays, instead of merely one, which must be removed and cleaned. The added burden of removing and cleaning an additional tray, and the extra time consumed in so doing, are serious disadvantages of the Krueger disclosure.

Another shortcoming of the Krueger patent results from its structure which permits bird excrement to accumulate within the feeding apparatus and increase the potential for feed contamination.

SUMMARY OF THE INVENTION

Because of the problems described, supra, an object of this invention is to provide a feeder for a bird cage which confines and directs seed, seed husks, and other materials discarded by the bird into the existing droppings collection tray of the cage.

It is a further object to avoid the use of additional trays for collecting detritus. Such use adds to the time, labor and inconvenience consumed in cleaning.

A further object is to provide an avian feeding environment in which cleanliness and sanitation are enhanced.

An additional object is to reduce or eliminate the scattering of seed materials on the floor area surrounding the bird cage.

The instant invention which accomplishes the forenamed objects is a mess-free bird feeder for a bird cage. It includes an enclosure with a generally open proximate end and a generally closed distal end. The enclosure has generally upright opposed side walls which terminate at the open proximate end. The open end permits passage of a live bird therethrough to feed. The side walls are joined by a distal end wall and a roof. The bottom is generally open for passage of rejected seeds, seed husks, bird excrement and the like downward into the cage where the material is collected and removed for disposal. The lower edges of the walls generally rest on the bed of the cage.

A feed tray is adapted to be removably placed within the enclosure adjacent the distal end, and the tray is held there by retaining means.

Perching means such as an elongate dowel-shaped member is located between the proximate end of the enclosure and the feed tray, within the enclosure. The perch may be fastened to the feed tray, to the side walls of the enclosure, or to other elements of the structure, and provides support for the bird while it is feeding. It is located within the enclosure so that seeds and other materials tossed by the bird will be intercepted and directed downward into the cage for collection and disposal. Because of the location of the feeder against one wall of the bird cage, the small quantity of materials which the bird may eject out of the open end of the feeder are nevertheless likely to drop onto the bird cage droppings tray. Thus, the floor area surrounding the bird cage will not receive the detritus.

In the following, the invention will be examined in more detail by means of the exemplifying embodiments depicted in the drawings.

DESCRIPTION OF THE PREFERRED EMBODIMENTS

Figure 4:
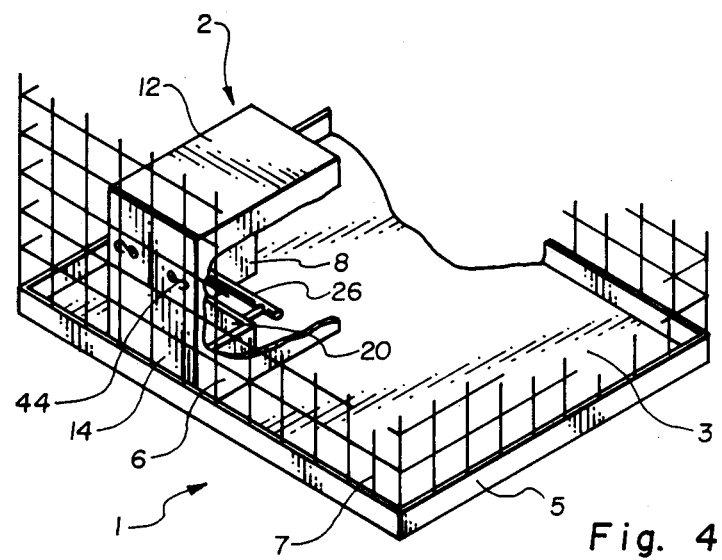
FIG. 4 is a cutaway perspective view of a typical bird cage with a bird feeder of this invention in place therein.

The relationship of this invention to a typical bird cage is illustrated in FIG. 4. Bird cage 1 is shown having a frame 5 and wire mesh walls 7. The bed 3 of the cage comprises a droppings tray which may be swung downward, or is removable for cleaning. Alternatively, the droppings tray 3 may be covered by a screen. Typically, newspaper or similar material are placed in droppings tray 3 to catch and retain the detritus which drops upon it, and to keep the tray relatively clean. The newspaper are periodically replaced to maintain a clean, sanitary and odor-free environment.

The bird feeder 2 of this invention is shown resting on tray 3 in abutment with a mesh wall of bird cage 1.

The particular construction of feeder 2 is now discussed with reference to FIGS. 1 and 2.

Figure 1:
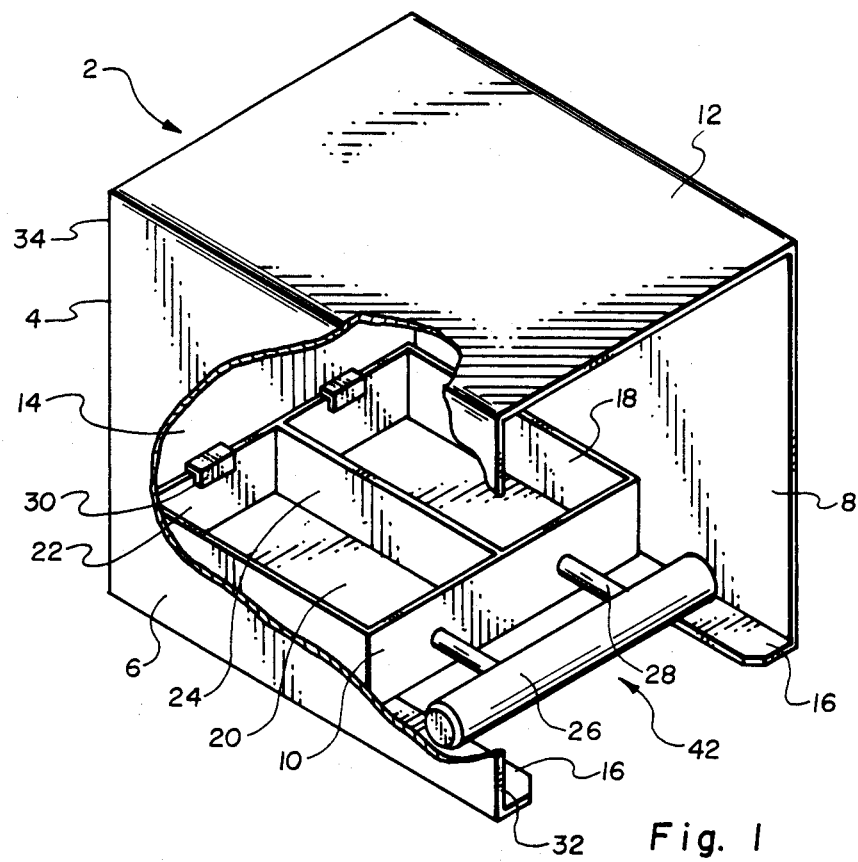
FIG. 1 is a cutaway perspective view of one embodiment of the bird feeder of the invention.
Figure 2:
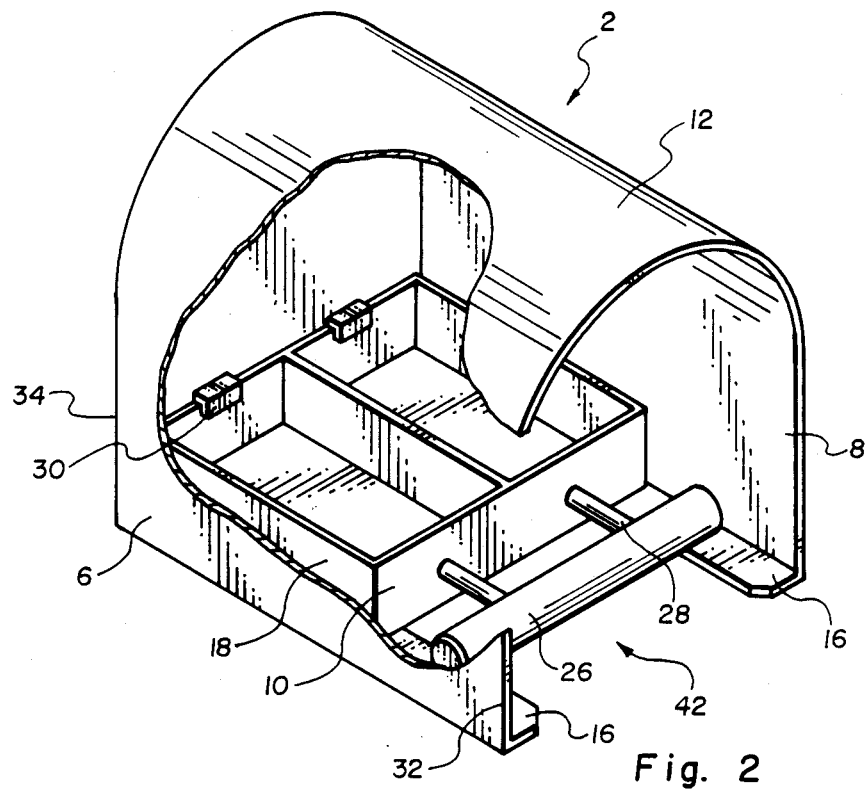
FIG. 2 is a cutaway perspective view of another embodiment of the bird feeder of the invention.

FIGS. 1 and 2 depict two embodiments of the mess-free bird feeder of this invention which differ only in the shape of the enclosure. FIG. 1 shows a flat roof 12 while FIG. 2 depicts the bird feeder with an arcuate roof 12. In all other respects the following description is applicable to both figures.

Bird feeder 2 has a housing or enclosure 4 with a generally open proximate end 42 and a generally closed distal end and a generally closed distal end wall 14. The enclosure 4 has generally upright opposed side walls 6 and 8 which are joined by distal end wall 14 and roof 12. The walls 6, 8 terminate at proximate edges 32 to form open proximate ends 42 through which a live bird may pass. Walls 6 and 8 also terminate at distal edges 34, which adjoin distal end wall 14.

The bottom of the enclosure 4 between walls 6, 8 and 14 is generally and substantially open for passage of rejected seeds, seed husks, bird excrement and the like downwardly therethrough. This detritus, some of which is tossed by the bird, is intercepted and directed downward by the walls, 6, 8 and roof 12 of the enclosure, or falls by gravity, into the droppings tray 3 of the bird cage 1.

A tray 20 for holding bird feed materials rests on flanges 16 extending inwardly from the lower portion of side walls 6, 8. Tray 20 has a front 10, sides 18 and rear 22. It may be divided by one or more partitions 24 to separate different feed materials. Tray 20 abuts or almost abuts distal end wall 14. It is shown as being held in this location by one or more detents 30.

Perching means 26 which may be an elongate rod, is spacedly joined to tray 20 by joining means 28, shown here as two legs. Perch 26 is situated within the enclosure 4 so that the bird sitting on the perch will be, for the most part, located within the enclosure. Walls 6, 8 will then effectively intercept materials thrown by the bird.

Perch 26 is also spaced from feed tray 20 so that excrement from a bird facing the outside will not contaminate the feed in tray 20, but will instead fall to the droppings tray.

In this embodiment, perch 26 also serves as a handle for removing the feed tray 20. The perch 26 is lifted until the rear 22 of the tray clears the detents 30, after which the tray and perch may be simply pulled from the proximate end of the enclosure for cleaning and refilling.

Returning now to FIG. 4, bird feeder 2 with its enclosed feed tray 20 and perch 26, is shown with its distal end wall 14 in abutment with cage wall 7. Attachment means 44 for securing the feeder wall 14 to the cage wall 7 is shown as a pair of S-hooks, each hooked through an aperture in wall 14, and around a wire of wall 7.

An alternative attachment means is an adhesive backed hood which may be attached to wall 14 at any desired location for hooking feeder 2 to the wire mesh wall. These attachment means are known in the art; any means may be used for retaining the feeder 2 in abutment relationship with wall 7. Use of the attachment means ensures that the feeder will not be displaced or tipped by bird activity or cage movement. It also supports the feeder when the droppings tray is swung down or removed for cleaning.

Figure 3:
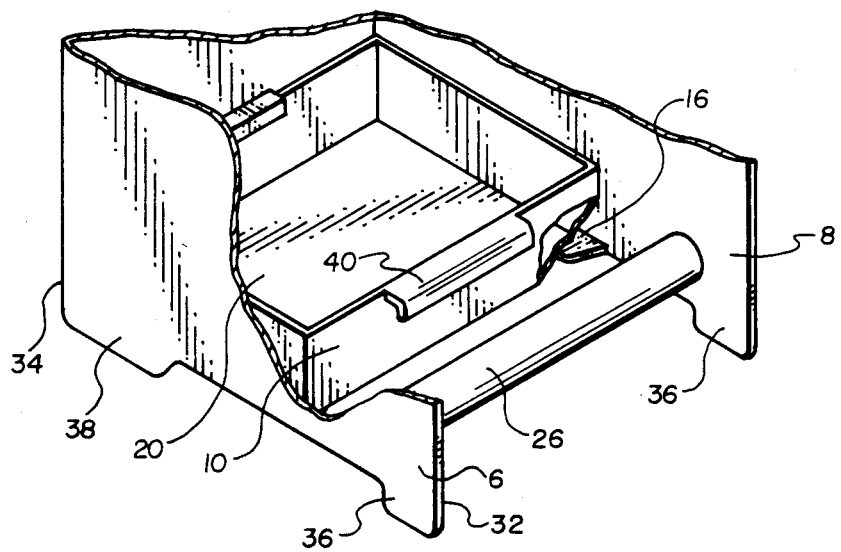
FIG. 3 is a cutaway perspective view of additional embodiments of the invention.

Several alternative features of the feeder are each illustrated in FIG. 3.

As shown, side walls 6 and 8 may be extended downward at the proximate and distal ends to form proximate feet 36 and distal feet 38, respectively. This permits excessive feed debris, normally confined to the droppings tray between the feed tray 20 and the perch 26, to flow laterally between feet 36 and 38, as well as into the space below feed tray 20. Thus, the opportunity for seed husks to accumulate to the point of overflowing into tray 20 is diminished.

Also shown in FIG. 3 is a variation in which perch 26 is supportedly joined to the opposed side walls 6 and 8. Also shown is handle 40 on the front 10 of tray 20, for lifting and removing the feeding tray from the feeder.

In a further variation, flanges 16 are shown as extending from the distal end to the front 10 of the feeding tray 20. There are no flanges between front 10 and the proximate end 42. Thus, this space is completely open for the downward passage of seeds, detritus and excrement to the droppings tray 3. Cleaning of the feeder is simplified.

The design of each component of this invention is simple, enabling its manufacture by one-piece or two-piece injection molding of plastic materials. Alternatively, the feeder may be formed of metal or other materials.

The feeder will be sized to accommodate the particular bird comfortably. Thus, a large parrot will require a larger feeder than a smaller parakeet.

This invention prevents seeds, husks and other detritus from being scattered in the area surrounding a bird cage. Furthermore, it promotes cleanliness of the feed tray and the perch, without having additional dropping trays to clean. It is readily adaptable to all bird cages and to a wide range of bird sizes.

What is claimed:

1. A mess free bird feeder for a bird cage with a droppings tray, comprising:
    an enclosure having a generally open proximate end and a generally closed distal end, said enclosure comprising:
        generally upright opposed side walls terminating at said open proximate end for passage of a live bird therethrough,
        a distal end wall joining said opposed side walls,
        a roof,
        a generally open bottom for passage of rejected seeds, seed husks, bird excrement and the like downwardly therethrough;
    a feed tray adapted to be removably placed within said enclosure adjacent said distal end wall
    retaining means for removably retaining said feed tray adjacent said distal end wall;
    perching means within said enclosure between said proximate end and said feed tray for supporting said bird;
    said bird feeder walls and roof comprising an enclosure for intercepting said seeds, seeds husks and the like and directing these materials downward into said droppings tray of said bird cage for collection and removal.

2. The bird feeder of claim 1, further comprising joining means for spacedly supportably joining said perching means to said feed tray, said perching means comprising a feed tray handle.

3. The bird feeder of claim 1, wherein said side walls include inwardly extending flanges for supporting said feed tray.

4. The bird feeder of claim 3, wherein said flanges extend along said side walls from proximate said distal end wall to proximate a front wall of said feed tray.

5. The bird feeder of claim 1, further comprising attachment means for securing said distal end wall of said bird feeder to a wall of said bird cage.

6. The bird feeder of claim 1, wherein said retaining means comprises one or more detents integral with said distal end wall.

7. The bird feeder of claim 1, wherein said perching mean is supportably joined to said opposed side walls.

8. The bird feeder of claim 1, wherein said opposed side walls further comprise feet to support said feeder on said droppings tray and to space said side walls from said droppings tray.

9. A waste confinement means for a bird comprising:
a bird cage having a lower droppings tray;
a bird feeding enclosure within said cage, said enclosure comprising;
  upright opposed side walls and a distal end wall joined thereto,
  a roof joined to said side walls and said end wall,
  a generally open proximate end and generally open bottom,
  wherein said enclosure intercepts tossed seeds, seed husks and the like and directs same downward through said open bottom into said droppings tray;
a feed tray removably placed within said enclosure adjacent said distal end wall;
perching means for supporting said bird substantially within said enclosure while said bird is feeding; and
means for retaining said feed tray and perching means within said enclosure.

* * * * *